(12) United States Patent
Heath et al.

(10) Patent No.: US 8,480,053 B2
(45) Date of Patent: Jul. 9, 2013

(54) METHOD AND APPARATUS FOR THE MECHANICAL ACTUATION OF VALVES IN FLUIDIC DEVICES

(75) Inventors: James R. Heath, South Pasadena, CA (US); Michael Van Dam, Glendale, CA (US); Arkadij Elizarov, Valley Village, CA (US)

(73) Assignee: California Institute of Technology, Pasadena, CA (US)

( * ) Notice: Subject to any disclaimer, the term of this patent is extended or adjusted under 35 U.S.C. 154(b) by 1675 days.

(21) Appl. No.: 11/514,396

(22) Filed: Aug. 30, 2006

(65) Prior Publication Data
US 2007/0051412 A1   Mar. 8, 2007

Related U.S. Application Data

(60) Provisional application No. 60/713,835, filed on Sep. 2, 2005, provisional application No. 60/765,150, filed on Feb. 3, 2006, provisional application No. 60/791,778, filed on Apr. 13, 2006.

(51) Int. Cl.
*F16K 7/04* (2006.01)

(52) U.S. Cl.
USPC .......... 251/7; 251/8; 251/331; 216/2

(58) Field of Classification Search
USPC ............ 216/2, 28, 27, 26; 137/154, 177, 137/178; 251/7, 8, 331, 335.2; 422/68.1, 422/99
See application file for complete search history.

(56) References Cited

U.S. PATENT DOCUMENTS

| | | |
|---|---|---|
| 2,716,017 A | 8/1955 | Linker |
| 2,971,851 A | 2/1961 | Kurtz |
| 3,378,406 A | 4/1968 | Rosansky |
| 3,407,249 A | 10/1968 | Landi ............................. 264/49 |
| 3,507,708 A | 4/1970 | Vignaud ......................... 429/86 |
| 3,613,729 A | 10/1971 | Dora ........................ 137/624.18 |
| 3,663,409 A | 5/1972 | Greene ......................... 204/408 |
| 4,062,750 A | 12/1977 | Butler .......................... 257/253 |
| 4,326,518 A | 4/1982 | Williams ...................... 128/214 |
| 4,500,905 A | 2/1985 | Shibata .......................... 257/74 |
| 4,696,195 A | 9/1987 | Savonlahti et al. ......... 73/864.84 |
| 4,721,133 A | 1/1988 | Sundblom ..................... 137/883 |
| 4,924,241 A | 5/1990 | Parks et al. ..................... 346/75 |
| 4,977,948 A | 12/1990 | Chandley ...................... 164/255 |
| 5,624,556 A | 4/1997 | Kutowy ................... 210/321.75 |

(Continued)

FOREIGN PATENT DOCUMENTS

| | | |
|---|---|---|
| WO | 00/73412 A2 | 12/2000 |
| WO | 01/73417 | 10/2001 |
| WO | 02/070932 | 9/2002 |
| WO | 02/072264 | 9/2002 |

OTHER PUBLICATIONS

U.S. Appl. No. 11/297,651, filed Dec. 7, 2005, Maltezos, et al.

(Continued)

*Primary Examiner* — Lan Vinh
(74) *Attorney, Agent, or Firm* — Steinfl & Bruno LLP (57) ABSTRACT

Mechanical actuation of valves in flexible fluidic structures allows for the regulation of fluid flow. In accordance with the disclosure herein, a fluidic structure is provided wherein mechanical actuation is conferred using a pin to actuate a flexible layer to occlude fluid flow in a fluid channel.

43 Claims, 6 Drawing Sheets

U.S. PATENT DOCUMENTS

| | | | | |
|---|---|---|---|---|
| 5,765,591 | A | 6/1998 | Wasson et al. | 137/597 |
| 5,863,502 | A | 1/1999 | Southgate et al. | 422/58 |
| 5,928,880 | A | 7/1999 | Wilding et al. | 435/7.2 |
| 5,989,402 | A | 11/1999 | Chow et al. | 204/601 |
| 6,065,195 | A | 5/2000 | Chatterjee et al. | 29/25.35 |
| 6,145,810 | A | 11/2000 | Connolly et al. | 251/331 |
| 6,158,712 | A | 12/2000 | Craig | 251/61.1 |
| 6,399,025 | B1 | 6/2002 | Chow | 422/102 |
| 6,752,371 | B2 | 6/2004 | Herbert et al. | 251/54 |
| 6,814,337 | B2 | 11/2004 | Schmaltz | 251/7 |
| 6,830,729 | B1 | 12/2004 | Holl et al. | 422/68.1 |
| 6,929,030 | B2 | 8/2005 | Unger et al. | 137/883 |
| 7,040,338 | B2 | 5/2006 | Unger et al. | 137/15.19 |
| 7,223,363 | B2 | 5/2007 | McNeely et al. | 422/58 |
| 7,862,000 | B2 | 1/2011 | Elizarov et al. | |
| 2001/0012612 | A1 | 8/2001 | Peterson | 435/5 |
| 2002/0127146 | A1* | 9/2002 | Bergh et al. | 422/89 |
| 2002/0166585 | A1 | 11/2002 | O'Connor et al. | 137/87.01 |
| 2003/0019833 | A1* | 1/2003 | Unger et al. | 216/2 |
| 2003/0190608 | A1 | 10/2003 | Blackburn | 435/6 |
| 2003/0194716 | A1 | 10/2003 | Knoll | 435/6 |
| 2003/0214057 | A1 | 11/2003 | Huang | 264/225 |
| 2004/0037739 | A1 | 2/2004 | McNeely et al. | 422/58 |
| 2004/0101444 | A1 | 5/2004 | Sommers et al. | 422/100 |
| 2005/0214173 | A1 | 9/2005 | Facer et al. | 422/100 |
| 2005/0266582 | A1 | 12/2005 | Modlin | 436/164 |
| 2006/0078475 | A1 | 4/2006 | Tai et al. | 422/102 |
| 2006/0163069 | A1 | 7/2006 | Prak et al. | 204/601 |
| 2007/0012891 | A1 | 1/2007 | Maltezos et al. | 264/308 |
| 2007/0051412 | A1 | 3/2007 | Heath et al. | 216/2 |
| 2007/0200081 | A1 | 8/2007 | Elizarov et al. | 251/331 |
| 2007/0272309 | A1* | 11/2007 | Rehm et al. | 137/528 |
| 2008/0131327 | A1 | 6/2008 | Van Dam et al. | 422/103 |
| 2009/0008253 | A1 | 1/2009 | Gilbert et al. | 422/68.1 |

OTHER PUBLICATIONS

Unger, M.A., et al., "Monolithic Microfabricated Valves and Pumps by Multilayer Soft Lithography", *Science*, vol. 288, No. 5463, pp. 113-116 (Apr. 2000).

Thorsen, T., et al., "Microfluidic Large-Sclae Integration", *Science*, vol. 298, No. 5593, pp. 580-584 (Sep. 2002).

Rolland, J.P., et al., "Solvent-Resistant Photocurable 'Liquid Teflon' for Microfluidic Device Fabrication", JACS, vol. 126, pp. 2322-2323 (2004).

van Dam, R.M., "Solvent-Resistant Elastomeric Microfluidic Devices and Applications", PhD Thesis, California Institute of Technology (Aug. 2005).

Studer, V., et al., "Scaling Properties of a Low-Actuation Pressure Microfluidc Valve", *Journal of Applied Physics*, 95 (1), pp. 393-398 (2004).

Fredrickson, C.K., et al., "Macro-to-Macro Interfaces for Microfluidic Devices", *Lab on a Chip*, 4, pp. 526-533 (2004).

Gu, W., "Computerized Microfluidic Cell Culture Using Elastomeric Channels and Braille Displays", PNAS, vol. 101, No. 45, pp. 15861-15866 (2004).

International Search Report for PCT/US2006/034083 filed on Aug. 30, 2006 in the name of California Institute of Technology.

Written Opinion for PCT/US2006/034083 filed on Aug. 30, 2006 in the name of California Institute of Technology.

Communication pursuant to Article 94(3) EPC issued by EPO for EP Application No. 06814022.7 dated Feb. 3, 2010.

Dharmatilleke, S., et al. Three-dimensional silicone microfluidic interconnection scheme using sacrificial wax filaments. Proceedings of SPIE, vol. 4177, pp. 83-90, Aug. 28, 2006.

Extended European Search Report and Written Opinion for EP 07763338.6 mailed on May 10, 2010.

PCT Search Report for PCT/US2007/003208 filed on Jul. 23, 2007 in the name of Elizarov, Arkadij et al.

PCT Written Report for PCT/US2007/003208 filed on Jul. 23, 2007 in the name of Elizarov, Arkadij et al.

PCT International Search Report for PCT/US2007/079601 filed on Sep. 26, 2007 in the name of California Institute of Technology and Arkadij Elizarov.

PCT Written Opinion for PCT/US2007/079601 filed on Sep. 26, 2007 in the name of California Institute of Technology and Arkadij Elizarov.

Lai, S. M et al. Knoevenagel condensation reaction in a membrane microreactor *Chem. Commun*, 2003, 218-219.

Yamamoto, T. et al. PDMS-glass hybrid microreactor array with embedded temperature control device. Application to cell-free protein synthesis *Lab Chip*, 2002, 2, pp. 197-202.

Psaltis, D. et al. Developing optofluidic technology through the fusion of microfluidics and optics *Nature*, 2006, 442, 381-386.

Grover,W. H. et al. Monolithic membrane valves and diaphragm pumps for practical large-scale integration into glass microfluidic devices *Sensors and Actuators E*, 2003,89,315-323.

Lee, C.-C. et al. Multistep Synthesis of a Radiolabeled Imaging Probe Using Integrated Microfluidics *Science*, 2005, 310, 1793-1797).

Gillies, J. M. et al. Microfluidic reactor for the radiosynthesis of PET radiotracers *J. Appl. Rad. Isot.* 2006, 64, 325-332.

Yuen, P. K et al. Semi-disposable microvalves for use with microfabricated devices or microchips *J. Micromech. Microeng*. 2000, 10, 401-409.

Liu, J. et al. Solving the "World-to-Chip" Interface Problem with a Microfluidic Matrix. Anal. Chem. 75, pp. 4718-4723, 2003.

Office Action issued by USPTO for U.S. Appl. No. 11/701,917 dated Dec. 16, 2009.

Office Action issued by USPTO for U.S. Appl. No. 11/701,917 dated Jun. 23, 2010.

Restriction Requirement issued by USPTO for U.S. Appl. No. 11/862,127 dated Oct. 16, 2009.

Office Action issued by USPTO for U.S. Appl. No. 11/862,127 dated Dec. 21, 2009.

Office Action issued by USPTO for U.S. Appl. No. 11/862,127 dated May 12, 2010.

Office Action issued by USPTO for U.S. Appl. No. 11/862,127 dated Oct. 4, 2010.

Notice of Allowance issued for U.S. Appl. No. 11/701,917, filed Feb. 2, 2007 in the name of Arkadij Elizarov; mail date: Oct. 28, 2010.

Final Office Action issued for U.S. Appl. No. 11/862,127, filed Sep. 26, 2007 in the name of Robert Michael Van Dam; mail date: May 10, 2011.

\* cited by examiner

FIGURE 1

PRIOR ART

METHOD AND APPARATUS FOR THE MECHANICAL ACTUATION OF VALVES IN FLUIDIC DEVICES

CROSS REFERENCE TO RELATED APPLICATIONS

This application claims priority to U.S. Provisional Ser. No. 60/713,835 for "Mechanism and Apparatus for the Mechanical Actuation of Microvalves in Elastomeric Microfluidic Devices" filed on Sep. 2, 2005; U.S. Provisional Ser. No. 60/765,150 for "Rigid Microfluidic Device With an Elastomeric Gas-Permeable Gasket" filed on Feb. 3, 2006, and U.S. Provisional Ser. No. 60,791,778 for "Rigid Microfluidic Device With an Elastomeric Gas-Permeable Gasket filed on Apr. 13, 2006 all of which are incorporated herein by reference in their entirety.

BACKGROUND

1. Field

The present disclosure relates to the mechanical actuation of valves in fluidic devices. In particular, a method and apparatus are disclosed for the mechanical actuation of valves in flexible, fluidic devices for the regulation of fluid flow.

2. Description of Related Art

PDMS (poly-dimethylsiloxane) microfluidic devices have enabled inexpensive rapid prototyping of sophisticated microfluidic applications (Unger, et al., 200, *Science*, 288: 113-116; Thorsen, et al., 2002, *Science*, 298:58-584). Due to incompatibilities with many solvents, acids, and bases, PDMS is not suitable for many applications in chemistry. However, several solvent-resistant elastomers have been shown to be suitable for functional microfluidic device fabrication, and can be used as a replacement for PDMS in certain applications (Rolland et al., 2004, JACS, 126: 2322-2323; van Dam, R. M. Solvent-Resistant Microfluidic Devices and Applications, PhD Thesis, California Institute of Technology, August, 2005).

Figure 1:
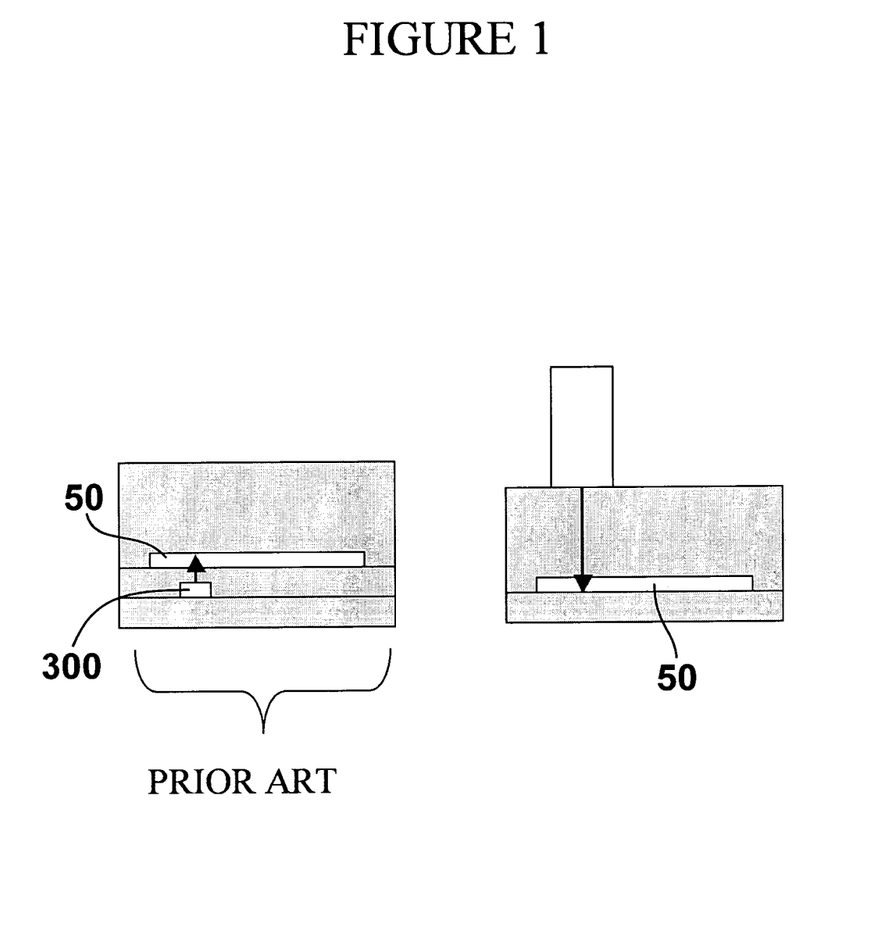
FIG. 1 shows a simplified diagram of the elastomeric microvalve of the prior art on the left and a mechanical valve of the present invention on the right.

Elastomeric devices in the art are constructed from two layers and a substrate as shown on the left in FIG. 1 (Studer et al, Journal of Applied Physics 95(1), 2004, pg 393-398). The fluid layer contains "fluid channels" (50), and the control layer (300) contains "control channels". Devices can also be fabricated with the control channel above the fluid channel; however, the configuration shown on the right in FIG. 1 results in valves with lower actuation pressures and allows more design flexibility in the fluid layer. FIG. 1 shows the operation of pneumatically/hydraulically actuated micro valves in which the control channels are pressurized to cause deflection of the thin elastomer membrane separating the control channel from the channel where they cross. Deflection of the control channel into the fluid channel obstructs the flow, thus acting as a valve.

One way to make off-chip connections (i.e. connections between the devices and off-chip components such as fluid reservoirs, waste containers, chromatography columns, and pressure supplies) is by punching holes through the elastomer before bonding to the substrate. Tubing (typically stainless steel) is then inserted directly into the holes. If the tubing is slightly larger than the hole, the tubing is held in place by the friction, enhanced by the elasticity of the device material, which squeezes around the tubing.

To actuate a valve, the pressure in the control channel (300)(FIG. 1) should be sufficient both to deflect the valve membrane material and overcome the pressure in the fluid channel (50). In some applications, for example, those involving evaporation of solvents such as water or acetonitrile, the fluid pressure can become quite high (30 psi or more, depending on temperature). The control channels should thus be pressurized to even higher pressures, leading in some cases to device failure by delamination of device layers (peeling apart), or rupture of device material. In PDMS chips designed for the synthesis of FDG (2-deoxy-2-[$^{18}$F]fluoro-D-glucose), an additional problem is presented when the device layers made of PDMS are bonded by plasma treatment. Such bonding is weakened under basic conditions. Since the first step of FDG synthesis involves evaporation of a $K_2CO_3$ solution to dryness, it leads to the device delamination at much lower pressures than the chips can normally withstand. Furthermore, at high pressures, failures can occur at connections to off-chip pressure sources. These problems are often exacerbated in solvent-resistant materials.

Therefore, what is needed is a new method and apparatus for the mechanical actuation of a valve in fluidic devices (FIG. 1 on the right) made from flexible materials that in the least eliminates both high pressure within the chip and the problems associated with the layer bonding of solvent-resistant materials found in the prior art.

SUMMARY

A new method and apparatus are provided herein for actuating valves in fluidic devices made from flexible materials. A "pin" or "piston" pushes on the flexible layer above a fluid channel, squeezing the channel shut, therefore acting as a valve. Mechanical actuation replaces pneumatic or hydraulic actuation.

According to a first aspect of the present disclosure, a fluidic structure is provided comprising: a first layer; a second layer contacting said first layer, said second layer being a flexible layer; a third layer contacting said second layer; at least one fluid channel, said at least one fluid channel positioned proximal to the second layer; at least one valve pin hole, said at least one valve pin hole passing through the third layer and stopping at the second layer; at least one pin, wherein the at least one pin is activatable to actuate the second layer, thereby occluding the at least one fluid channel.

According to a second aspect of the present disclosure, a method of fabricating a fluidic structure comprising the steps of forming a first layer; forming a second layer contacting said first layer, said second layer being a flexible layer; forming a third layer contacting said second layer; forming at least one fluid channel positioned proximal to said second layer; forming at least one valve pin hole; providing at least one pin; providing a means of actuating the at least one pin in order to actuate the second layer to occlude the at least one fluid channel.

One advantage of the present disclosure is that it obviates the problems associated with microfluidic devices of the prior art which includes high pressure in the control channels that can lead to failure of layer bonding and failure of off-chip connections. One result of this is that a greater variety of materials can be used in the fabrication of devices, expanding the range of applications that can be implemented with such devices. Mechanical pin actuated valves can also be actuated with much greater force than pneumatic/hydraulic valves allowing the control of higher-pressure fluids, as well as enabling valves to seal properly even if channel recesses have suboptimal surface smoothness or cross-sectional geometry. This advantage further expands the range of materials and fabrication methods for fluidic devices.

DETAILED DESCRIPTION

A new method and apparatus for the actuation or control of valves on a fluidic structure is disclosed herein, comprising a fluid channel, a valve pin hole and a pin or some similar object to be used as a "pin" or "piston" that actuates a flexible layer that is positioned proximal to the fluid channel, thereby squeezing or occluding the fluid channel closed, thereby acting as a valve.

Figure 2:
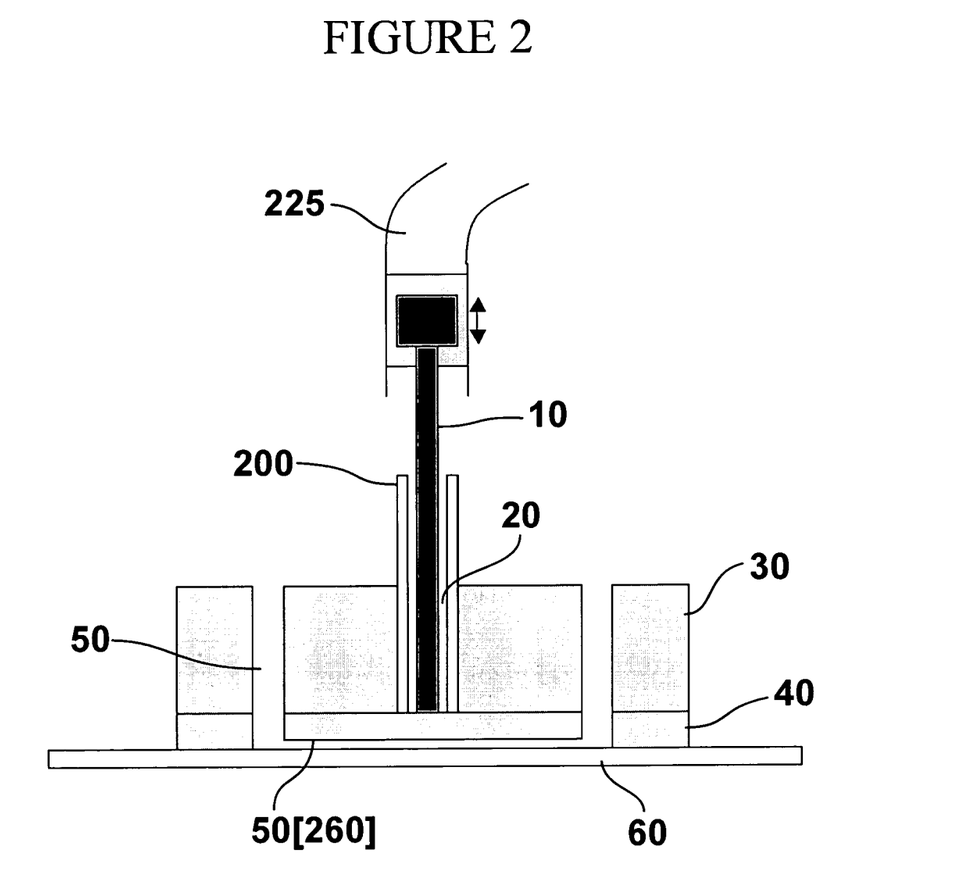
FIG. 2 shows a schematic of a fluidic structure comprising the first (60), second (40) and third (30) layers, the fluid channel (50), the valve pin hole (20) and an actuating pin (10), pin guide (200) and Teflon tubing (225).

The present disclosure provides for a fluidic structure using mechanical pin actuation to regulate fluid flow on a chip that processes small (nanoliters) to larger amounts (milliliters) of fluid compounds. The mechanical actuation of the pin is created by pressure applied to the pin, which in its "off" position is not deflecting the flexible layer of the fluidic device. Mechanical actuation of the pin can also result from the use of a solenoid. A fluidic device comprises a first, second and third layer, at least one fluid channel and at least one valve pin hole. A schematic of a representative fluidic device is shown in FIG. 2. Upon actuation of the pin (10), the pin moves into a valve pin hole (20) of the synthesis chip. The valve pin hole passes through a third layer (30) of the chip which is made of a rigid or elastomeric material. The sides of the valve pin hole are defined by this third layer. The closed end of the valve pin hole is defined by a second layer (40) which is made of flexible material and is in contact with the third layer.

Figure 3:
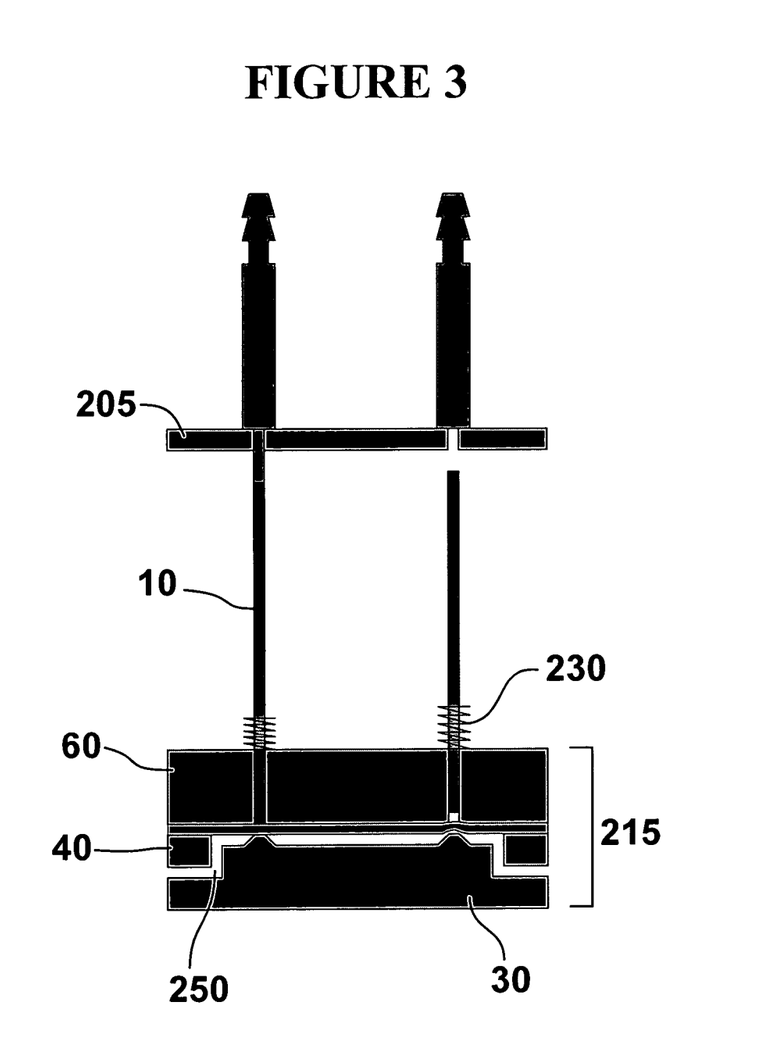
FIG. 3 shows a fluidic structure having a first layer recess (250) such that the fluidic channel is at least partially formed within the first layer.
Figure 4:
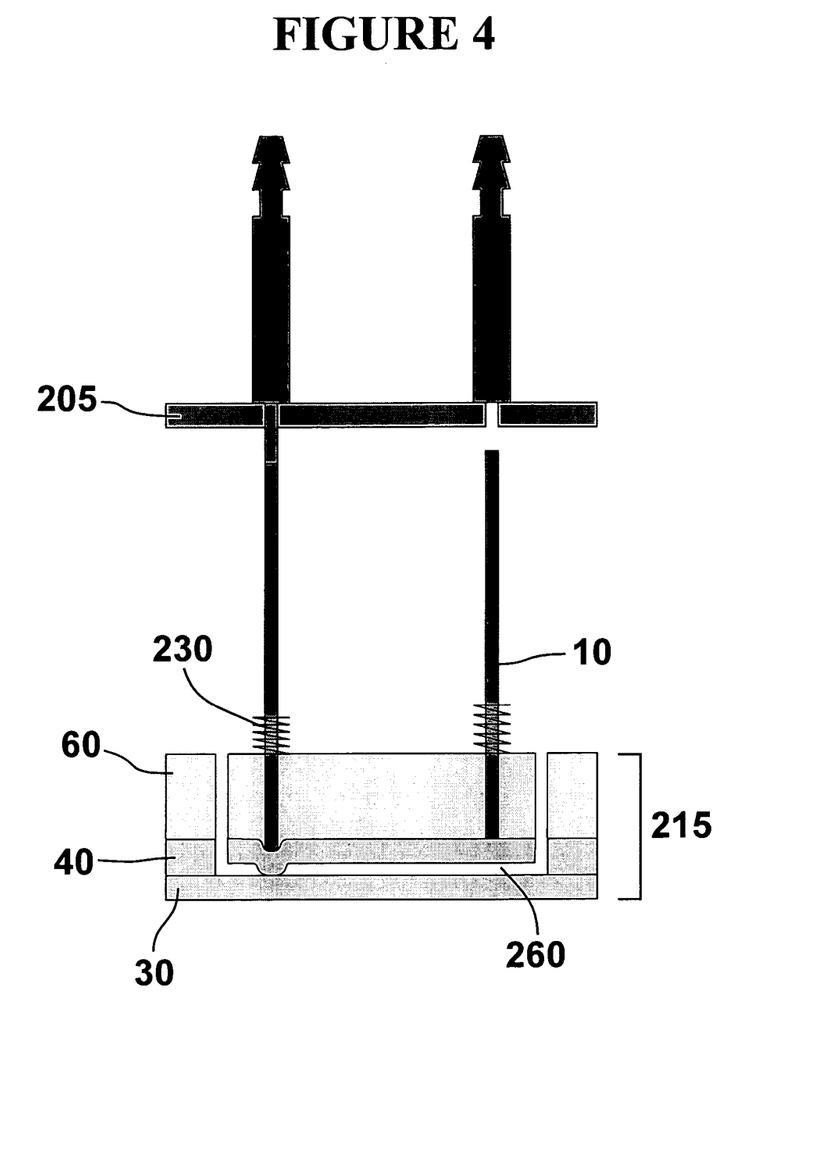
FIG. 4 shows a fluidic structure having a second layer recess (260) such that the fluidic channel is at least partially formed within the second layer.

The synthesis chip further comprises at least one fluid channel (50) in which fluids can flow. In one embodiment the first layer (60) contains a fluid recess (first layer fluid recess, 250) such that the fluid channel is at least partially formed within the first layer and the fluid channel is positioned between the first layer and the second layer (FIG. 3). In a further embodiment, the second layer contains a fluid recess (second layer fluid recess, 260) such that the fluid layer is at least partially formed within the second layer and the fluid channel is positioned between the second layer and the first layer (FIG. 4).

In one embodiment, a fluid channel of the present disclosure is proximal to the second layer, such that when the pin is moved into the valve pin hole and the pin is moved to the end of the valve pin hole which is either closed at the end by the second layer or a layer in contact with the second layer, the pin actuating the closed end will result in the actuation of the second layer such that the proximal fluid channel is occluded. This occlusion occurs when the pin is in its "on" position. When actuation of the pin is removed, the pin is moved out of the valve pin hole thus the second layer is not actuated and the fluid channel proximal to the second layer is not occluded. No occlusion occurs when the pin is in its "off" position.

It should be obvious to one of skill in the art that the pin in its "on" position will stop fluid flow in the fluid channel, and the pin in its "off" position allows for fluid flow in the fluid channel. This "on"/"off" actuation mechanism regulates fluid flow in the fluidic device of the present disclosure.

In an alternative embodiment, the pin is attached to the second layer such that the "off" position requires a "pull" of the pin to open or "un-occlude" the fluid channel. Further, such a set up could also facilitate reopening or removing actuation of the second layer, especially if the second layer is made from a flexible non-elastomeric material that does not have restoring force.

Fabrication Materials for the Layers of the Fluidic Structure

The fabrication materials for and methods of fabrication of the layers (first, second and third) of the present disclosure can be carried out as previously disclosed in the art (U.S. Pat. No. 7,040,338; U.S. application Ser. No. 11/297,651) In one embodiment, the first and third layers are made of rigid materials such as plastic, glass, or metal. The first and third layers can also be made of elastomeric material such as polydimethylsiloxane (PDMS) which can be made following the manufacturer's instructions. It should be noted that the first and third layers do not need to be of the same material. Other possible materials for the first and third layers, include, but are not limited to: PDMS-coated glass, PDMS-coated silicon, silicon, perfluoropolyether, acrylic, polycarbonate, graphite, perfluoropolyether, perfluoropolyether-coated-glass, as well as PDMS (such as RTV 615™ from GE Silicones, and Sylgard 184™ from Dow Corning). The second layer can be made from a variety of flexible materials which include, but are not limited to: fluorosilicone, PDMS, perfluoropolyether (see Rolland et al., 2004, JACS, 126: 2322-2323), Chemraz, nitrile rubber, chloroprene rubber, as well as PDMS. For elastomeric materials, is should be understood by one of skill in the art that elastomers exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The layers of the present invention can be fabricated from a wide variety of elastomers. The choice of elastomer depends on the needs of a particular application of the fluidic structure. Any elastomeric polymer should be suitable.

The needed flexibility from elastomers can be similarly obtained from non-elastomeric materials which are flexible under pin actuation as disclosed herein. In one embodiment, flexible, nonelastomeric materials that are suitable for the second layer, include, but are not limited to: Teflon (DuPont), PVDF (polyvinylidine difluoride), polyurethane, and polyethylene. Similar flexible, nonelastomeric materials to those listed could also be used for the second layer. The requirement merely for a flexible, rather than elastic, layer, expands the range of materials that can be used in fluidic devices, when compared with pneumatically/hydraulically actuated valves of the prior art.

In an alternative embodiment, if the first layer is made of a rigid, nonelastomer material, a layer of elastomer can be added to the first layer, such that the place in the fluid channel which would be occluded by the actuation of the second layer is not only flexible on the side defined by the second layer, but also on the opposite side in the direction of the first layer.

Fluid recesses in the first and second layer can be formed by molding on micromachined molds, etching, micromachining, micromilling, among other techniques.

Bonding of Layers

In view of the pin actuation as disclosed herein, the bonding of the first, second and third layers as is required by methods of the prior art, is not necessary. Bonding of the layers essentially depends on the materials used to fabricate the layers and some materials cannot practically be bonded together without distorting or filling channel features or otherwise damaging critical components of the fluidic device. In such cases, layers can be held together by screws, clamps, or similar tools.

However, if bonding is used, for example, if the second and third layers are made of PDMS, these layers can be bonded together using methods known in the art (see, for example, U.S. Pat. No. 7,040,338). Bonding may also be achieved by methods that include, but are not limited to: chemical bonding, solvent bonding, heat bonding, gluing, or partial curing techniques.

Fluid Channels

In a further embodiment, the fluidic device comprises more than one fluid channel (50). In another embodiment fluid channels are designed such that a different fluid can flow through each of the more than one fluid channel. In another embodiment, all fluid channels lead to a reactor area (90) in a synthesis chip (215). The reactor area can serve as the area for fluid deposit, at which incoming fluids can mix, pass through, be heated and so forth. As described herein, a fluid can refer to a gas or liquid.

In one embodiment, the synthesis chip comprises several fluid channels (50) and the same number of valve pin holes (20). The fluidic structure would further comprise the same number of actuating pins (10) corresponding to each valve pin hole. The flow of each fluid to the reactor can thus be controlled independently.

Figure 5:
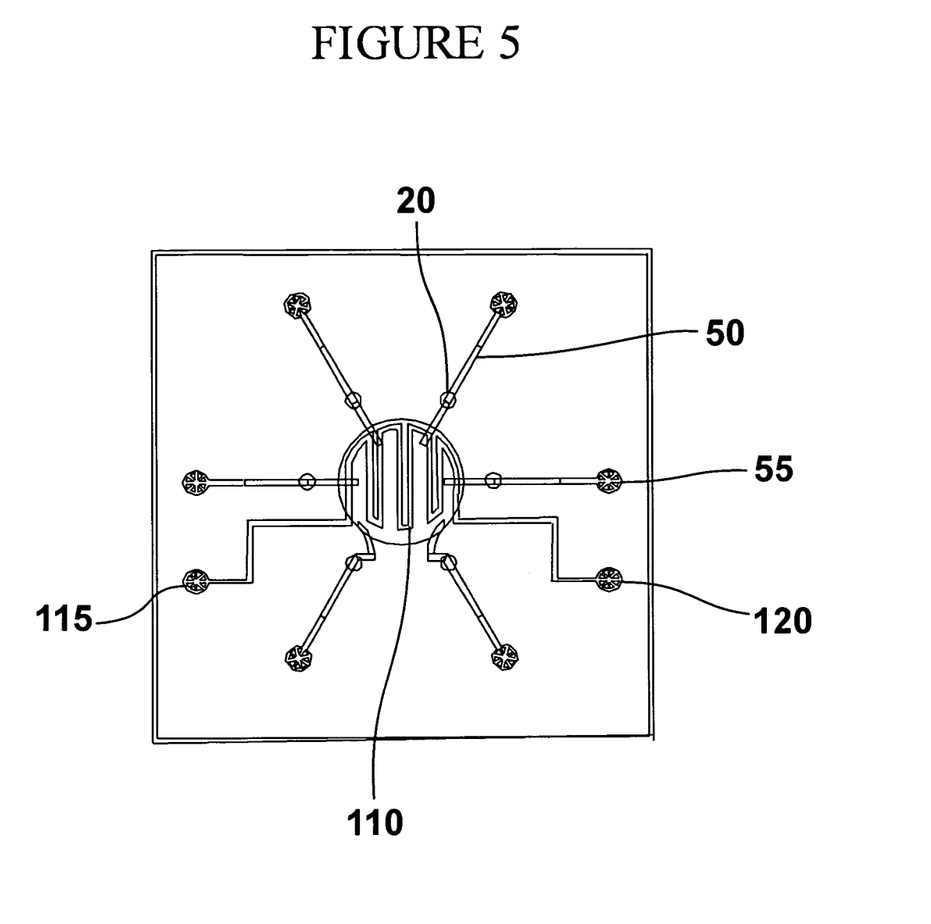
FIG. 5 shows a top-view schematic of fluidic structure having a 6-valve pin hole (20) arranged in a symmetrical radial pattern, with 6 corresponding fluid channels (50) further comprising a vent channel (110) having an input (115) and an output (120).

Fluid channels in a fluidic structure of the present disclosure can be fed fluid using a variety of methods disclosed in the art (see U.S. patent application Ser. No. 11/297,651, Fredrickson and Fan, *Lab on a Chip*, 4:526-533, 2004). There is at least one input to each fluid channel, referred to as the fluid channel input (55) (FIG. 5). In a further embodiment, the fluidic structure comprises an outgoing fluid channel. The number of "outgoing" fluid channels can be less than the number of "ingoing" fluid channels which are referred to herein as fluid channel (55). Alternatively, the number of "outgoing" fluid channels can be greater than the number of "ingoing" fluid channels.

Dimensions and Positioning of Fluid Channels and Layers

Dimensions of the fluid channels and layers can vary as previously described in the art (U.S. Pat. No. 6,929,030). Larger channels than those previously described can also be used. If higher flow rates are desired, larger channels are necessary. The size of the channels should be determined by the desired application and the desired features for a fluidic structure. An exemplary fluid channel of the present disclosure is 250-300 µm in width, 125-300 µm in depth, with a reactor depth of 250-300 µm.

The thickness of the second flexible layer can vary over a large range—from less than 10 µm to nearly 1000 µm. The thickness of the second layer is determined by the manufacturability, ability to assemble the layers into devices, strength of the materials used, as well as the flexibility of the materials used. If fluid channel recesses are present in the second layer, a greater thickness of the second layer provides more tolerance to misalignment of the valve pin with the channel, relaxing the fabrication constraints.

Using pin actuation of the present disclosure renders the thickness of the first and second layer not as critical as it is for fluid channel occlusion using methods of the prior art.

In one embodiment, the fluid channel comprises a first layer recess (250), wherein the fluid channel is formed in the first layer (FIG. 3). In another embodiment, the fluid channel comprises a second layer recess (260), wherein the fluid channel is formed in the second layer (FIG. 4).

Pins and Valve Pin Holes

One of skill in the art can envision a variety of possible materials to be used as the pins. In one embodiment, the pins are metal wire (an example of such can be purchased from Gambit Corporation). One of skill in the art can envision that the smaller the pin, the more likely it is to act as a needle and tear or prick through an elastomer layer such as PDMS. Thus, when applying the present invention on a smaller scale, it may be preferred to use a hollow pin (e.g. a hollow metal tube), or any shape that is not sharp. In one embodiment, the width of the pin is equal to or larger than the fluid channel width. In another embodiment, the width of the pin is smaller than the fluid channel width. In most cases where the width of the pin is smaller than the fluid channel width, it is preferred that the first and second layers are made of an elastomeric material, e.g. PDMS. In a further embodiment, the pins are made of flexible metal. Pin flexibility can provide flexibility in the design and placement of the valve pin holes.

A fluidic structure of the present disclosure comprises at least one valve pin hole. In one embodiment, each valve pin hole corresponds to one fluid channel. That is, each actuated pin corresponds to a valve pin hole whereby the actuated pin in the valve pin hole occludes a corresponding fluid channel.

In a further embodiment, more than one valve pin hole (20) can be positioned in the third (30) and second layers (40) such that upon actuation, the same fluid channel is occluded by more than one pin. In this case, the number of valve pin holes (20) would be greater than the number of fluid channels (50). One could also contemplate a fluidic structure comprising regulated fluid channels which have corresponding valve pin holes, and unregulated fluid channels, which do not have valve pin holes. However, it would seem more advantageous to have a corresponding valve pin hole for each fluid channel, and if the fluid channel was to be unregulated, the corresponding pin would not be actuated. Many variations of the number of fluid channels and the number of valve pin holes and the arrangement of each can be easily envisioned and contemplated by one skilled in the art.

Sufficiently narrow pins (depending on length and material) are flexible and can bend; thus the pin actuating mechanism need not be aligned directly with the location where the fluid channel occludes during valve actuation. For bulky pin actuation mechanisms, this allows the valve pin holes to be located more closely together (in a denser fluidic structure) than the actuator mechanisms.

In one specific embodiment, multiple valve pin holes are arranged in a symmetrical circular pattern, equidistant apart allowing for the most space for each corresponding pin and pressure tubing as shown with six valves in FIG. 5. The smaller the fluid channels and valve pin holes, the smaller the pins and the more of each that can fit in a given area. In a preferred embodiment, the fluid channels are oriented radially and valve pin holes are symmetrically aligned, thus allowing for the holes to maintain alignment over each respective channel in the event that the fluidic device material shrinks during fabrication and/or the valve pins flex during operation. In order to maintain symmetry, at least two valve pin holes are placed in the third layer. With only two valve pin holes, a stabilizing mechanism can be used to maintain alignment in the direction perpendicular to the direction from one pin hole to the other. With at least three pin holes (e.g. six valve pin holes (20) as shown in FIG. 5), a stabilizing mechanism is not necessary, provided these valve pin holes are arranged in a circular/radial pattern as shown. The elastic bending forces of flexed pins help to center the chip below the pin plate.

A radial pattern of valve pin holes as presently disclosed, maintains the pins aligned over the fluid channels by sacrificing accuracy of exact valve position along the channel to provide advantages in other aspects such as pin flexure, pin tilt, pin guide tilt and maintained symmetry upon material shrinkage. In some fluidic structure assemblies, it is helpful to use a pin guide (200) (FIGS. 2 and 6) to prevent valve pin hole damage and to provide accurate positioning proximal to the second layer to obtain fluid channel occlusion when the pin is "on". Pin guides are generally required when the third layer is made from an elastomer, but not when the third layer is made from a rigid, durable material.

In an alternative embodiment, a return plate is part of the fluidic structure acting as a spring stop. A return plate is preferably positioned between the third layer and the pin plate. The return plate allows for the use of a spring (230) to push the pins up when the pressure is released to allow the valve (or valves) to open. The return plate also serves to dampen the impact of the pins when actuated so that they are not damaged and to reduce the likelihood that the pins puncture the second layer of the fluidic device. Dampening of impact can also be accomplished by other methods, e.g. by inserting air restrictors that cause the actuator pressure (e.g. in Teflon tubing (225) to gradually rise upon actuation of a valve. Return can also be accomplished by mechanism internal to the actuator (e.g. within commercial pneumatic cylinders).

In one embodiment the return plate is not used, thus allowing the flexible pins and Teflon tubing to follow a contour, resulting in less friction between the pins and the pin valve holes or pin guides and providing more flexibility in the pin assembly as discussed above. In a further embodiment, the third layer can serve as a return stop. In this way, springs can be used with the pins in the absence of a return plate by using pin guides or the third layer of the chip as the spring stop. The end of the spring furthest from the spring stop may rest against the head of the pin or may be attached to the pin, e.g. by spot welding. A vacuum can also be applied to aid in returning the pins back out of the valve pin hole.

In a further embodiment, a pumping mechanism can be produced using the fluidic structure of the present invention, whereby the fluidic structure comprises at least three consecutive valve pin holes, whereby activated pins actuate the second layer in repeating sequence to produce peristaltic pumping. For certain applications, this type of mechanism may be desired and can be implemented by one of skill in the art using the fluidic structure as disclosed herein.

Pin Actuation

An actuation pin of the disclosed fluidic structure can be assembled using a variety of approaches such that when the pin is "off" it is not actuating the second layer such that the second layer occludes the fluid channel. A pin in its "off" position is not necessarily removed from the valve pin hole. It can be more practical to maintain the pin position in the valve pin hole in its off position.

Figure 6:
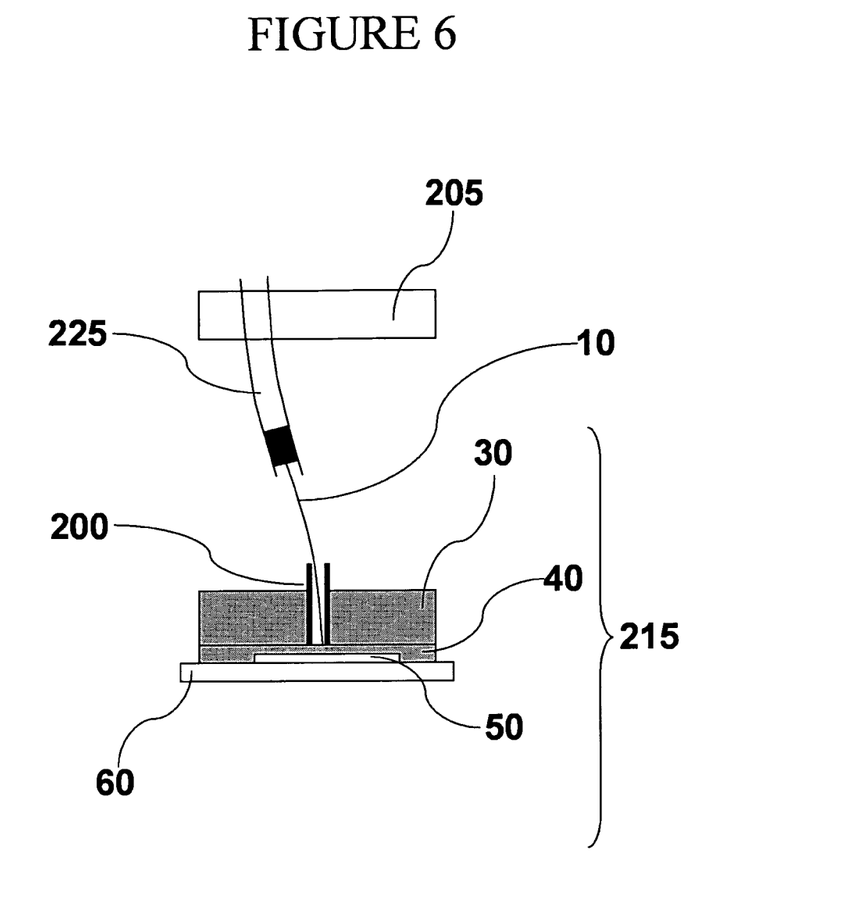
FIG. 6 shows a fluidic structure with a pin guide (200), and the structure further comprising a flexible pin (10), Teflon tubing (225) and pin plate (205).

In one embodiment, the pin motion is controlled by inserting the head of a pin inside a Teflon tube (225) (DuPont) that can be pressurized to force the pin into the valve pin hole and actuate the elastomeric second layer to occlude ("squeeze") the fluid channel, thereby closing it and stopping fluid flow. Additionally, epoxy can be used to match the pin head to the Teflon tubing inner diameter. In other words, a 'plug' of epoxy around the pin head can be used while it is inside a Teflon tube (225). Such a Teflon tube (225) with attached pins as shown in FIGS. 2 and 6, is attached to a pin plate (205) (FIG. 6) mounted on the fluidic structure above the fluidic device (215). In one embodiment, a pin plate is positioned proximal to the third layer to stabilize the pin or pins, or to stabilize the actuator mechanisms for each pin.

The pin can be actuated (moved) by applied pressure or by coupling the pin to a solenoid (Electromechanisms, San Dimas, Calif.). The pin can be actuated pneumatically. This can be carried out by connecting the pin to a commercially available pneumatic cylinder (Festo, Hauppauge, N.Y.) instead of sliding within Teflon tubing. In another embodiment, the pneumatic cylinder has a built-in return spring. An actuated pin moves further into the valve pin hole. In an alternative embodiment, the head of the pin (15) can be molded with epoxy, or some similar material to facilitate actuation of the second layer, and subsequent occlusion of the fluid channel. Applied pressure to actuate the pin as disclosed herein, can be applied between 0 and 80 pounds per square inch (psi), and if necessary, up to 100 psi. Applied pressure in the form of air or gas can be used. Specifically, gases, for example, nitrogen, argon, or helium can be used.

The Fluidic Structure

The present disclosure comprises a first layer; a second layer contacting said first layer, said second layer being a flexible layer; a third layer contacting said second layer; at least one fluid channel, said at least one fluid channel positioned proximal to the second layer; at least one valve pin hole, said at least one valve pin hole passing through the third layer and stopping at the second layer; at least one pin, wherein the at least one pin is activatable to actuate the second layer, thereby occluding the at least one fluid channel; wherein the above together forms an integrated fluidic device.

The fluidic structure of the present invention can have many orientations. In a vertical orientation, the first layer can be a lower layer, in which case, the second layer is a middle layer overlying the first layer, and the third layer is an upper layer, overlying the second middle layer. Alternatively, the first layer is an upper layer, wherein the second layer is a middle layer underlying the first layer, and the third layer is a lower layer, underlying the second middle layer.

In a horizontal orientation, the first layer is a right layer positioned to the right of the second layer which is positioned to the right of the third layer, which is the left most layer. Alternatively, the first layer is a left layer positioned to the left of the second middle layer, wherein the middle layer is positioned to the left of the third layer, wherein the third layer is the layer on the right of the middle layer.

Scale of Fluidic Structure

The size and scale of the fluidic structure of the present disclosure and the corresponding channel and pin sizes can vary as needed for a given application. It is apparent to one of skill in the art that there are advantages and disadvantages at both the micron (small) size and millimeter (larger) size. Thus, one of skill in the art can optimize the scale of the fluidic structure that will work best for a given application. The fluidic structure of the present disclosure can comprise channels which range in size from 10 µm to 1 mm in width and height having pins ranging in size from 0.25 inches to 12 inches or more in length and 100 μm to 1 millimeter or more in diameter. One can also contemplate a pin having a diameter of up to 1 centimeter Temperature Control The fluidic structure of the present disclosure can be combined with a temperature control device such as a thermoelectric heater/cooler, resistive heater, microwave heater, or other controllable heat source, possibly combined with a heat sink and a fan to rapidly dissipate heat when the temperature must be reduced. A fluidic structure can have an attached temperature effector positioned below the fluidic device (215) proximal to the first layer. An array of temperature control devices can be coupled with the present disclosure as needed for a particular fluidic reaction. One of skill in the art can provide a temperature control device to the fluidic structure of the present disclosure. Heating elements integrated into one of the layers of the fluidic device can also be contemplated, based on principles such as resistive heating, Joule heating, or Peltier effect. One could also envision dedicated channels within the fluidic structure that carry heating or cooling fluids.

In an alternative embodiment a fluidic structure, and more specifically, a fluidic device of the present disclosure comprising a reactor area also comprises at least one vent channel. Such a vent channel (110) (FIG. 5) can be one of a variety of formations, as long as it facilitates the evaporation of solvent from the reactor area and enables reduction of reactor area pressure. The vent channel in FIG. 5 forms a serpentine pattern proximal to the reactor area. Such a vent channel can be part of the second layer. The vent channel of FIG. 5 shows an input (115) and output (120), one of which is plugged and the other connected to a vacuum. Another possible vent channel pattern is a right-angled U-shape directly above the reactor area in the second flexible layer allowing for evaporation through this layer above the reactor area. A vent channel is preferably formed by a recess within the third layer and positioned proximal to the reactor area. The second layer forms a membrane between the reactor area and the vent channels across which gas (air) can diffuse.

Applications

Advantageous applications of the present mechanically activated fluidic structure are numerous. Accordingly, the present invention is not limited to any particular application or use thereof. In preferred aspects, the following uses and applications for the present invention are contemplated. Due to its elimination of the need for control channels, unlikely the prior art, the mechanical valves of this invention would be particularly advantageous for processes involving reasonably high fluid channel pressures (e.g. high temperature reactions) or when layers cannot be strongly bonded.

In a general application, the fluidic structure is used to control fluid flow in an integrated fluidic device to carry out a fluidic process.

The fluidic process may involve the synthesis of a compound by one or more reaction steps, the reaction steps comprising addition of a particular reactant, mixing, heating, cooling, exchanging solvents, etc.

A fluidic device as described in this invention could also carry out the process of solvent exchange. A first fluid reactant is fed through a fluid channel, and a solute is trapped in a trapping region of the fluidic device (chromatography column, fluid channel or fluid cavity) by some means; a subsequent second fluid reactant is fed through a second fluid channel through the same trap region, whereby the solute is suspended in the second fluid reactant. In this way, the fluidic structure of the present disclosure would provide a new method for solvent exchange.

The fluidic device of the present disclosure could be more specifically a "purification chip", wherein microscale (or at least smaller scaled) purification steps are carried out in a reactor area of a fluid channel as disclosed instead of the commonly used chromatography methods. In such an application, varying channel and valve pin hole materials would be necessary depending on the characteristic molecules and/or proteins to be purified.

One could also imagine the above processes (synthesis, solvent-exchange, purification, etc.) being combined into an integrated fluidic process.

The fluidic structure as disclosed can be used in applications including, but not limited to: biopolymer synthesis, cell sorting, DNA sorting, chemical synthesis, therapeutic synthesis, optofluidics, and semiconductor processing.

In summary, mechanical actuation of valves in flexible fluidic structures allows for the regulation of fluid flow. In accordance with the disclosure herein, a fluidic structure is provided wherein mechanical actuation is conferred using a pin to actuate a flexible layer to occlude fluid flow in a fluid channel.

While illustrative embodiments have been shown and described in the above description, numerous variations and alternative embodiments will occur to those skilled in the art. Such variations and alternative embodiments are contemplated, and can be made without departing from the scope of the invention as defined in the appended claims.

The invention claimed is:

1. A fluidic structure comprising:
   a first layer;
   a second layer contacting said first layer, said second layer being a flexible layer;
   a third layer contacting said second layer;
   at least one fluid channel, said at least one fluid channel positioned proximal to the second layer;
   at least one valve pin hole, said at least one valve pin hole passing through the third layer and stopping at the second layer; and
   at least one pin, wherein the at least one pin is activatable to actuate the second layer to occlude the at least one fluid channel,
   the fluidic structure being configured as a synthesis chip, wherein the at least one fluid channel has a fluid channel width; the least one pin has a pin width, and the pin width is smaller than the fluid channel width.

2. The fluidic structure of claim 1, wherein the at least one pin is positioned in the valve pin hole.

3. The fluidic structure of claim 1, wherein the first layer is provided with a coating of elastomer such that the at least one fluid channel is defined in the second direction by the second layer on one side and by the first layer with a coating of elastomer on an opposite side.

4. The fluidic structure of claim 1 wherein the at least one pin is a hollow metal tube.

5. The fluidic structure of claim 1 wherein the first layer, the second layer, the third layer, the at least one fluid channel, and the at least one valve channel together form an integrated fluidic device.

6. The fluidic structure of claim 1 further comprising a pin plate, positioned in the direction opposite of the valve pin holes to stabilize the at least one pin.

7. The fluidic structure of claim 1 further comprising at least one pin guide, positioned in the at least one valve pin hole.

8. The fluidic structure of claim 1 further comprising a return plate, positioned between the third layer and the pin plate.

9. The fluidic structure of claim 1 wherein a spring is used to return the at least one pin to its unactuated position after actuation.

10. The fluidic structure of claim 1 wherein said first layer is a lower layer; said second layer is a middle layer overlying the lower layer, and said third layer is an upper layer overlying the middle layer.

11. The fluidic structure of claim 1 wherein said first layer is an upper layer; said second layer is a middle layer underlying the upper layer, and said third layer is a lower layer underlying the middle layer.

12. The fluidic structure of claim 1 wherein said first layer is a right layer; said second layer is a middle layer positioned to the left of the right layer, and said third layer is a left layer positioned to the left of the middle layer.

13. The fluidic structure of claim 1 wherein said first layer is a left layer; said second layer is a middle layer positioned to the right of the left layer, and said third layer is a right layer positioned to the right of the middle layer.

14. The fluidic structure of claim 1, said first layer containing a first layer fluid recess such that said at least one fluid channel is at least partially formed within said first layer, said at least one fluid channel being positioned between said first layer and said second layer.

15. The fluidic structure of claim 1, said second layer containing a second layer fluid recess such that said at least one fluid channel is at least partially formed within said second layer, said at least one fluid channel being positioned between said second layer and said first layer.

16. The fluidic structure of claim 1 wherein the at least one pin has a pin length, the pin length ranging from 1 millimeter to 12 inches.

17. The fluidic structure of claim 1 wherein the at least one pin has a pin diameter, the pin diameter ranging from 100 micrometers to several millimeters.

18. The fluidic structure of claim 1 wherein the first layer is made of a rigid material.

19. The fluidic structure of claim 1 wherein the first layer is made of a flexible material.

20. The fluidic structure of claim 1 wherein the first layer is made of at least one selected from the group of plastic, glass, metal, PDMS-coated glass, PDMS-coated silicon, silicon, perfluoropolyether, acrylic, polycarbonate, graphite, perfluoropolyether, perfluoropolyether-coated-glass, and PDMS.

21. The fluidic structure of claim 1 wherein the third layer is made of a rigid material.

22. The fluidic structure of claim 1 wherein the third layer is made of a flexible material.

23. The fluidic structure of claim 1 wherein the third layer is made of at least one selected from the group of plastic, glass, metal, PDMS-coated glass, PDMS-coated silicon, silicon, perfluoropolyether, acrylic, polycarbonate, graphite, perfluoropolyether, perfluoropolyether-coated-glass, and PDMS.

24. The fluidic structure of claim 1 wherein the second layer is made of an elastomeric material.

25. The fluidic structure of claim 1 wherein the second layer is made of a non-elastomeric material.

26. The fluidic structure of claim 1 wherein the second layer is made of at least one selected from the group of Teflon, polyvinylidine difluoride, polyurethane, polyethylene, fluorosilicone, perfluoropolyether, Chemraz, nitrile rubber, chloroprene rubber, and PDMS.

27. The fluidic structure of claim 1, wherein the at least one fluid channel is a plurality of fluid channels and wherein the at least one valve pin hole and the at least one pin are positioned between fluid channels of the plurality of fluid channels.

28. An array comprising a plurality of fluidic structures of claim 1, the plurality of fluidic structures arranged around a reactor area.

29. The array of claim 1, wherein the plurality of fluidic structures are radially arranged around the reactor area.

30. The fluidic structure of claim 1, wherein the at least one fluid channel is located in the third layer.

31. The fluidic structure of claim 1, wherein the at least one pin is a flexible pin.

32. The fluidic structure of claim 1, said structure being a microfluidic structure.

33. The fluidic structure of claim 1, wherein said second layer comprises a reactor area for reaction of fluid deposit.

34. The fluidic structure of claim 33 further comprising a reactor area vent channel, said reactor area vent channel contacting at least the third layer, said vent channel located proximal to the reactor area.

35. The fluidic structure of claim 1 wherein the at least one valve pin hole comprises at least two valve pin holes positioned through the third layer and the second layer such that a symmetrical pattern is formed.

36. The fluidic structure of claim 35 comprising at least six valve pin holes.

37. The fluidic structure of claim 1, wherein the at least one pin is activatable by applied pressure or a solenoid.

38. The fluidic structure of claim 37 wherein the applied pressure is air or gas pressure.

39. The fluidic structure of claim 38 wherein the air or gas pressure is applied between 0 and 100 pounds per square inch (psi).

40. The fluidic structure of claim 1, wherein the at least one pin is a mechanically actuated pin.

41. The fluidic structure of claim 40, wherein the mechanically actuated pin is a solenoid-actuated pin.

42. A fluidic structure comprising:
a first layer;
a second layer contacting said first layer, said second layer being a flexible layer;
a third layer contacting said second layer;
at least one fluid channel, said at least one fluid channel positioned proximal to the second layer;
at least one valve pin hole, said at least one valve pin hole passing through the third layer and stopping at the second layer; and
at least one pin,
wherein:
the at least one pin is activatable to actuate the second layer to occlude the at least one fluid channel,
the at least one fluid channel has a fluid channel width,
the least one pin has a pin width, and
the pin width is smaller than the fluid channel width.

43. The fluidic structure of claim 42, said structure being a microfluidic structure.

* * * * *